Jan. 20, 1959    F. H. McCORMICK    2,870,313
DOMESTIC APPLIANCE

Filed May 18, 1954    4 Sheets-Sheet 1

INVENTOR.
Francis H. McCormick
BY
R. K. Candor
Attorney

Jan. 20, 1959  F. H. McCORMICK  2,870,313
DOMESTIC APPLIANCE
Filed May 18, 1954  4 Sheets-Sheet 2
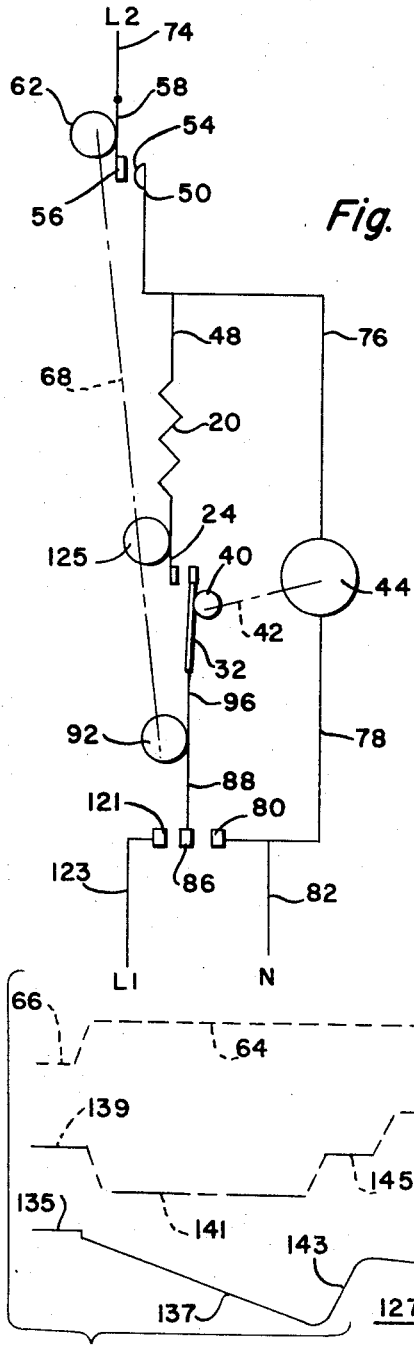
Fig. 3
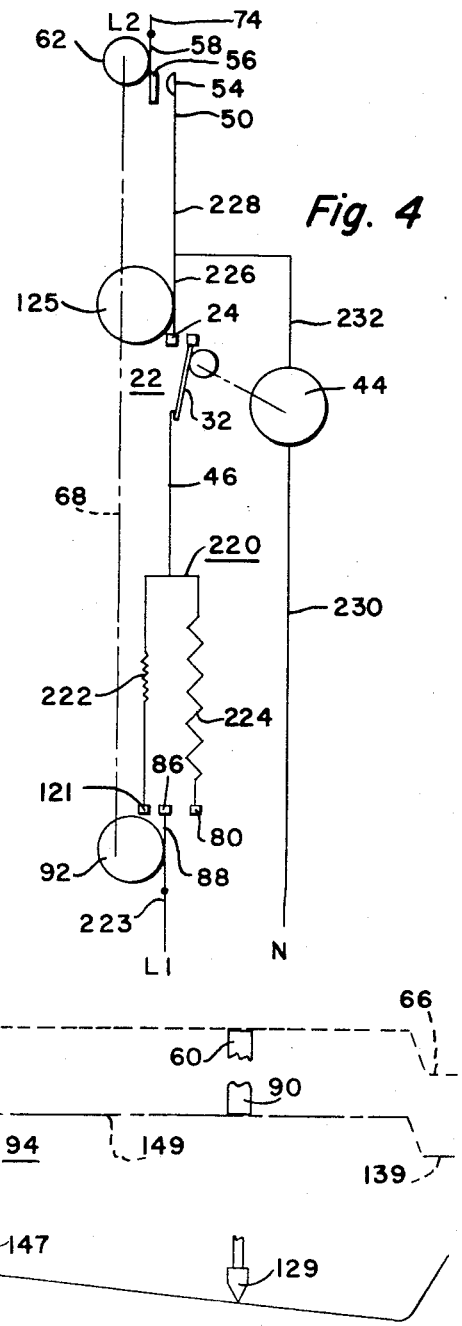
Fig. 4
Fig. 5
INVENTOR.
Francis H. McCormick
BY
*R R Candor*
Attorney Jan. 20, 1959

F. H. McCORMICK 2,870,313

DOMESTIC APPLIANCE

Filed May 18, 1954

INVENTOR.
Francis H. McCormick
BY R R Candor
Attorney

Jan. 20, 1959  F. H. McCORMICK  2,870,313
DOMESTIC APPLIANCE
Filed May 18, 1954  4 Sheets-Sheet 4

INVENTOR.
Francis H. McCormick
BY R K Candor
Attorney

United States Patent Office 2,870,313
Patented Jan. 20, 1959

2,870,313
DOMESTIC APPLIANCE

Francis H. McCormick, Dayton, Ohio, assignor to General Motors Corporation, Detroit, Mich., a corporation of Delaware Application May 18, 1954, Serial No. 430,551

10 Claims. (Cl. 219—20)

The invention relates to control systems for electric heating units and, more particularly, to an improved control of surface heaters of domestic electric ranges.

Most surface heaters of electric ranges are controlled by multiposition switches to provide a number of fixed power inputs. There are some occasions in cooking when no one of the fixed switch positions provides exactly the amount of power input desired. As a solution to this problem, some ranges have been provided with "Infinite" heat switches which intermittently open and close the electric circuit to the surface heater at definitely timed intervals. These intervals are varied as desired so that it is theoretically possible to obtain any average power input between the limits of 0 and 100% of the maximum power input of the surface heater. Such an "Infinite" switch may be timed as to the intervals by a small synchronous electric motor driving a cam which actuates a set of electric contacts, as disclosed in Wilhjelm Patent #1,767,636, or the regularly timed intervals may be obtained through the action of a heated strip of thermostatic metal, as described in Appelberg Patent #1,908,676.

In using a surface heater of an electric range, the maximum power input is normally used to bring the food up to the desired cooking temperature, then the power input is reduced to a lower value as required to maintain the food at cooking temperature. Most of the use of such a surface heater for cooking utilizes relatively low power inputs, i. e., from ¼ of the maximum down to about ¹⁄₁₂ of the maximum. With such low power inputs, operations such as warming food, simmering, slow boiling, active boiling and low temperature frying, are accomplished and it is in this area that a precise control of the power input is desirable for closely maintaining the desired cooking temperature.

A conventional "Infinite" heat switch is deficient in several respects for use in obtaining these low power inputs in that the time interval during which the heating circuit is closed is quite short and it is difficult to manufacture cams to open and close the circuit with sufficient precision. Also, each opening and closing of the circuit to the heater tends to cause a voltage fluctuation in the supply circuit which may be noticeable in lights connected to the same circuit and may impair the radio reception on sets connected to this circuit. Further, the pulsing of the electric current from the maximum input to 0 results in undue fluctuation in the temperatures of the heating element during each timed cycle. This temperature fluctuation is evident, particularly when cooking delicate foods at low temperatures, such as sauces, custards, etc.

It is an object of my invention to provide a control apparatus for electric heating units which permits a substantially complete range of power inputs from 0 to 100% of the maximum without objectionable variations in the temperature of the surface heater.

It is another object of my invention to provide a control apparatus for electric heating units and employing an "Infinite" heat switch which assures a more precise control of lower range of heat inputs.

It is another object of my invention to provide a control apparatus for electric range surface heaters wherein the "Infinite" heat type of switch control may be used in which the "on" and "off" heating cycles may be of increased length, such that the frequency of electric current variations are reduced with less hazard in causing voltage fluctuations or voltage interferences in the supply circuit.

It is another object of my invention to provide an arrangement wherein a surface heater with an "Infinite" heat switch control is connected to a low voltage source when lower power inputs are required and to a higher voltage source when higher power inputs are desirable.

These and other objects are attained by providing an infinite heat switch with a cam adjustment which traverses substantially the entire range of from 0 to 100% in a one-quarter turn while a second cam holds the power supply in a low voltage arrangement or energizes a low wattage high resistance heating element. In the remaining three-quarters of a turn the second cam holds the supply connections in a high voltage position or connects to a high wattage low resistance heating element while the infinite heat switch is adjusted by the first cam in the latter three-quarters of a turn between 25 and 100% of its adjustment.

Frequent attention on the part of the operator is ordinarily required in cooking upon the surface heaters of domestic ranges. Ordinarily it is desired to heat the contents of the container at the maximum rate up to the cooking or boiling temperature and then to reduce the heat rate to just the value required to maintain the contents at a desired cooking or boiling temperature with little or controlled vaporization until the cooking or boiling is completed.

It is a further object of my invention to provide an automatic adjustable control for a surface heater making possible the continuous heating at a maximum rate until the temperature is reached to which it is set after which the power input or rate of energy conversion is lowered and additionally controlled by an infinite heat type of control.

It is another object of my invention to combine a thermostat and infinite heat control in a simple and inexpensive way so that there is a single temperature adjusting system for both and continuous heating of the heating element at maximum capacity is provided until the temperature is reached to which it is adjusted after which the temperature is maintained by a lower capacity heating system under the control of an infinite heat control.

In cooperation with such a control, it is an object to prevent the burning of food should the lower capacity heating provide a sufficient rise in temperature.

The last group of objects are attained in the third and fourth form shown which includes a control member adjusted by a dial knob and screw. The control member carries a contact arrangement for varying the characteristics of an infinite heat control. The control member is also connected to a thermostatic control which above a selected temperature connects the infinite heat control to a low capacity surface heating system and below the selected temperature shunts the infinite heat control and energizes a maximum capacity surface heating system. The thermostatic control is also provided with a lost motion connection with a second contact arrangement connected in series with the surface heating unit and operated by the overtravel of the control to open position at a temperature above the selected opening temperature of the normal thermostatic control.

Further objects and advantages of the present invention will be apparent from the following description, reference being had to the accompanying drawings, wherein a preferred form of the present invention is clearly shown.

In the drawings:

Figure 3 is a simplified wiring diagram of the form shown in Figure 1;

Figure 4 is a simplified diagram of a modified form of the invention providing low and high resistance heating elements;

Figure 5 is a diagram illustrating the contours of the cam shown in Figure 1;

Figure 1:
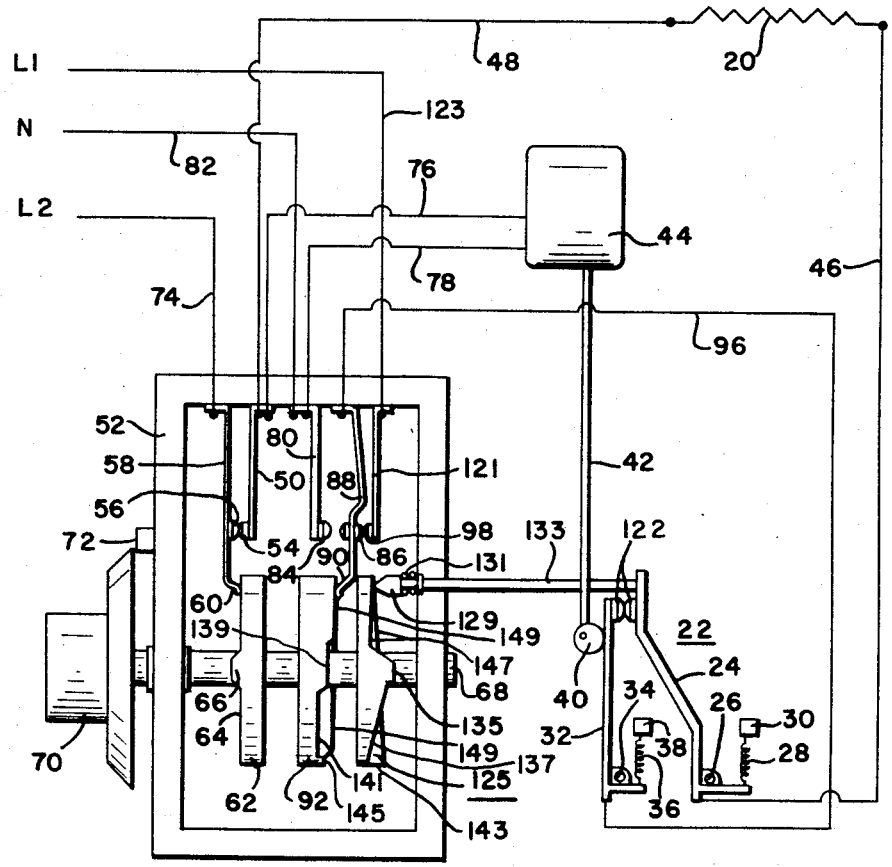
Figure 1 is a view in elevation, partly diagrammatic, of a control system and electric heating unit embodying one form of my invention.

Referring now to the drawings and more particularly to Figure 1, there is shown diagrammatically a single element surface heating unit 20 of an electric range. This surface heating unit is connected in series with an infinite heat switch means 22 which includes a pivoted adjustable arm 24 pivotally mounted upon the pivot 26 and having a bell crank lever portion which is continuously urged in the counterclockwise direction by a tension coil spring 28. This tension coil spring is connected between the bell crank lever portion of the arm 24 and a stationary anchorage 30. The infinite heat switch 22 also includes an oscillatable arm 32 pivoted upon the pivot pin 34 and having a bell crank arm connected to a tension coil spring 36 having its other end connected to a stationary anchorage 38.

This coil spring 36 tends to urge the arm 32 in a counterclockwise direction about its pivot 34 so as to keep it in engagement with the oscillating cam 40. This oscillating cam 40 may be in the form of an eccentric which is of course eccentrically mounted upon the output shaft 42 of a 115 volt synchronous motor 44 which may be geared to reduce the speed of the shaft 42 to about 1 R. P. M.

The arm 24 is connected by an electrical conductor 46 with one terminal of the heater 20 while the second terminal of the heater 20 is connected by the conductor 48 to the contact arm 50 within the control structure 52. This control structure 52 may be made of a box-shaped frame of electrical insulating material. The contact arm 50 is normally stationary and at its lower end carries a contact 54 which is adapted to be contacted by a cooperating contact 56 upon a spring arm 58. This spring arm 58 is provided with an extension 60 in the form of a follower which rides upon the adjacent surface of the cam 62. This cam 62 is provided with a contour 64 illustrated in Figure 5 which includes a projection 66 adapted to engage the follower portion 60 of the arm 58 to operate the contacts 54 and 56 when the cam shaft 68 is turned to the off position as indicated by the dial knob 70. The dial knob 70 is adapted to cooperate with a stationary index pointer 72 which may be provided on the structure 52.

The shaft 68 is rotatably mounted upon bearings within the walls of the structure 52. The contact arm 58 is connected by the conductor 74 with one terminal $L_2$ of the power supply. The contact arm 50 is also connected by the conductor 76 to one terminal of the motor 44 while a second terminal of the motor 44 is connected by the conductor 78 to a second normally stationary contact arm 80 which in turn is connected by the conductor 82 to the neutral supply conductor N. In this arrangement whenever the contacts 54 and 56 are closed, the motor 44 will be energized to continuously rotate the shaft 42 and the oscillating arm 40.

The contact arm 80 at its lower end carries a contact 84 adapted to be engaged by one side of a double contact 86 projecting from opposite sides of a spring contact arm 88. This spring contact arm 88 is provided with a cam follower 90 which is held by its own resiliency in a continuous contact with the surface of the cam 92 fixed to the cam shaft 68. This cam 92 has a cam surface 94 as indicated by the curve so designated in Figure 5. The spring arm 88 is connected by the conductor 96 to the contact arm 32 of the infinite heat switch 22. The other face of the contact 86 is adapted to make engagement with the contact 98 provided on the lower end of the normally stationary contact arm 121. The upper ends of each of these contact arms is connected to the upper wall of the structure 52. The contact arm 121 is connected by the conductor 123 to the power supply connection $L_1$.

The cam shaft 68 also has fixed to it a third cam 125 having a cam contour 127 substantially like the curve so indicated in Figure 5. The surface of this cam 125 cooperates with a follower 129 spring pressed by the spring 131 into engagement with the surface of the cam 125. This spring 131 is provided between the shoulder on back of the head of the follower and the adjacent wall of the structure 52. The follower 129 includes a follower shaft 133 extending into engagement with the end portion of the contact arm 24. The cam 125 includes a high portion 135 to hold the arm 24 far enough away from the arm 32 that there can be no contact between the contacts on these arms. The cam 125 also includes a gradually receding surface 137 which permits the arm 125 also includes a gradually receding surface 137 which permits the arm 24 to come successively closer to the arm 32. In so doing, the engagement of the portion of maximum eccentricity during each revolution of the eccentric or cam 40 will cause the two contacts to be engaged briefly. This adjustment is so arranged that as the follower 129 engages successive portions of the cam 137, greater amounts of the surface of the cam 40 are engaged by the arm 32 so that the proportion of time during which the contacts are closed increases uniformly from 0 to 100%, in a manner similar to the system shown in the Wilhjelm Patent 1,767,636. If desired, there may be substituted an infinite heat control of the type shown in the Appleberg Patent 1,908,676.

When the cam 125 has its high portion 135 in contact with the follower 129, the cam 92 has its beginning portion 139 in contact with the follower 90 so as to hold the contacts 86 at their midpoint equally spaced from the contacts 84 and 98. When the follower 129 is in contact with the slope 137, the follower 90 engages a recessed portion 141 of the cam surface 94 so that the spring contact arm 88 moves the contact 86 into engagement with the contact 84. This causes the heating unit 20 to be connected across the supply conductors N and $L_2$ to apply a voltage limited to about 117 volts (see Fig. 3). When the cams are in this first ¼ of the range of adjustment, the maximum rate of conversion of the electric energy to heat in the electric heater 20 is limited to one-quarter of its maximum. This is further reduced by the intermediate opening of the contacts on the contact arms 24 and 32. This is a most useful arrangement of surface heating cooking operations since the reduction of the maximum instantaneous rate of conversion to one-quarter of the maximum rate makes it possible for the infinite heat contacts of the infinite heat switch 22 to be closed a much greater portion of the time so that a much more accurate control can be obtained in this range of greatest usefulness. It reduces the voltage fluctuation in the supply circuit and reduces the light flicker and possible radiation interference as well as reduces the fluctuation in temperature of the heating unit 20.

When the follower 129 reaches the end of the slope 137 it reaches a position where the contacts of the arms 24 and 32 are closed 100% of the time. To obtain a further gradual increase in the heating rate, the cam surface 127 is provided with a steep rise 143 which lifts the follower 129 to a position wherein the contacts on the arms 24 and 32 are closed only 25% of the time. At the same time the cam surface 94 is provided with a rod 145 rotated in the same relative radius as the rise 143 so as to shift arm 88 first to its neutral position and thence after the cam follower 129 has reached the top of the rise 143 to lift the follower 90 so as to shift the spring arm 88 and the contact 86 into engagement with the normally stationary contact 98 which is connected by the conductor 123 to the entire $L_1$.

The heating unit 20 is then connected in series with the infinite heat switch contacts 122 across the supply conductors $L_1$ and $L_2$ to provide a maximum rate of energy conversion across the supply voltage of 235 volts. The power supply preferably is of the single phase three wire type providing 235 volts across the supply conductors $L_1$ and $L_2$ and 117 volts between the neutral supply conductor N and either of the other supply conductors $L_1$ and $L_2$. This lifts the maximum rate of conversion of electric energy in the heating unit 20 to four times the rate in the first portion of the range indicated on the knob 70 by the indications warm and simmer. In the remainder of the positions on the entire knob 70 indicated by low boil, high boil, low fry, high fry and high this latter maximum instantaneous rate of conversion is provided. The cam surface 127 in these positions is provided with a gradual slope 147 which gradually increases the closed contact time of the contacts upon the ends of the arms 24 and 32 from 25% to 100% as the knob is turned from the low boil position through the high boil and low and high fry positions to the high position. At the same time in the same angular position as this slope 147 the cam surface 94 is provided with a raised portion 149 which holds the contact 86 in engagement with the contact 98. Thus throughout this portion of the adjustment of the knob 70, the closed contact time will never be less than 25% so that accuracy may be retained and circuit and heat fluctuations minimized.

When the knob 70 is returned to the off position, the follower 129 returns to the high projection 135 which holds the infinite heat switch contacts open. The cam surface 149 again returns the intermediate surface 139 into engagement with the cam follower 90 so as to hold the spring contact member 88 in its intermediate position to break the connection with the supply conductors $L_1$ and N. The cam surface 64 returns the projection 66 into engagement with the follower 60 so as to separate the contacts 54 and 56 which disconnects the entire circuit from the terminal $L_2$. With this arrangement shock hazard is eliminated when the knob 70 is in its off position since both terminals of the heating unit 20 are disconnected from the supply conductors. The motor 44 is likewise disconnected from the live supply conductor.

Figure 2:
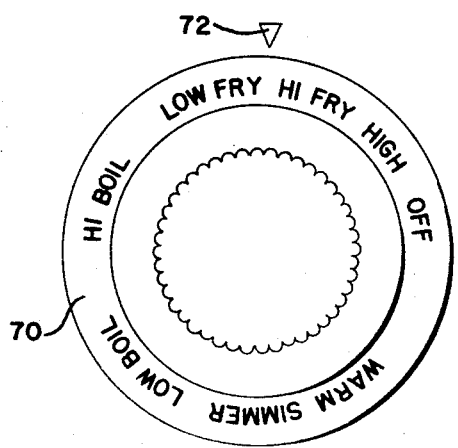
Figure 2 is a front view of the knob shown in Figure 1.

In Figure 4 the same control system shown in Figures 1 and 2 is used to control a heating unit 220 which includes a low resistance high wattage element 222 and a high resistance low wattage heating element 224. The common terminal of the elements 222 and 224 is connected to the conductor 46 while the other terminal of the heating element 224 is connected to the contact arm 80. The other terminal of the heating element 222 is connected to the contact arm 121. The spring contacting arm 88 is then connected by a conductor 223 to the terminal $L_1$. The conductor 46 connects to the contact arm 32 while the contact arm 24 is connected by the conductors 226 and 228 to the contact arm 50. The contact arm 58 is connected to the supply conductor $L_2$. The synchronous motor 44 has one terminal connected by the conductor 230 to the supply terminal N while the other terminal of this motor is connected by the conductor 232 to the conductor 228.

Thus by this reconnection, a two element heater having a low resistance high wattage element and a high resistance low wattage element may be connected by the different wiring connections as illustrated in Figure 4 to employ the same apparatus shown in Figure 1 to accomplish the same result. No change in the cams is required. As in the forms shown in Figures 1 and 2, the rotation of the knob 70 through the simmer and warm positions gradually increases the closed contact time of the infinite heat switch 22 from 0 to 100% while the contact 86 is in contact with the contact 80 to cause the energization of the high resistance low wattage element 224 which preferably has a resistance four times as great as the heating element 222 to reduce the current flow during any closed period to one-quarter the current flow allowed by the heating element 222. When the knob is turned through the positions from low boil to high, the proportion of the closed contact time of the infinite heat switch 22 increases from 25% to 100% while the contact 86 is in engagement with the contact 121 to connect the element 222 in series with the switch 22 so as to allow four times the current flow during the closed periods of the infinite heat switch 22.

Figure 6:
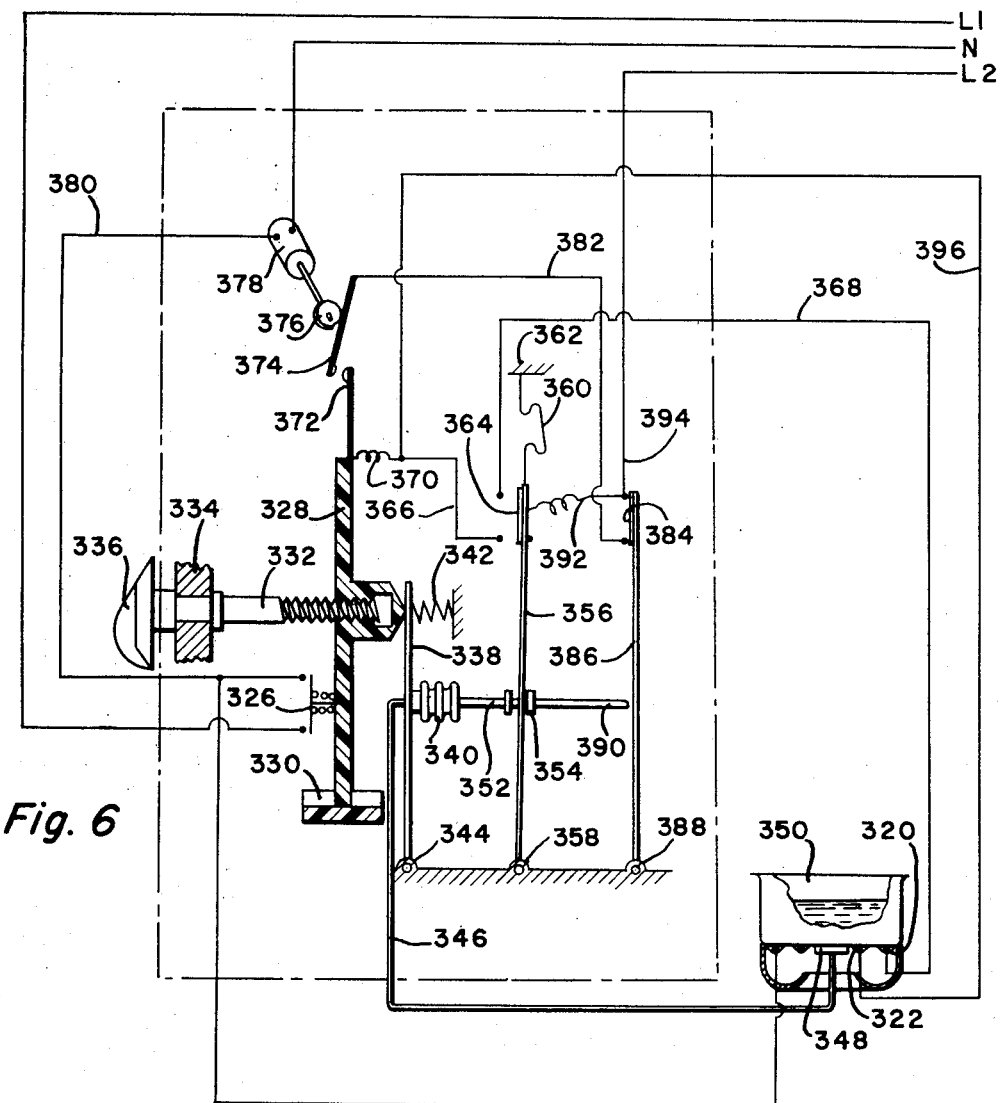
Figure 6 is a diagrammatic representation of a control and electrical system embodying a third form of my invention.

In the third and fourth forms, continuous heating at the maximum rate or voltage is terminated when correct cooking temperature is reached by a thermostat which thereafter operates the surface heater at a reduced wattage or voltage under the additional control of an adjustable infinite heat switch. Referring now to the drawings and more particularly to Figure 6 there is shown diagrammatically a two-element surface heating unit including the large element 320 and a small element 322. The common terminal of the elements 320 and 322 are connected by the conductor 324 through a bridge-type contact 326 to the supply conductor $L_1$. The bridge-type contact 326 is preferably resiliently mounted upon the control member 328. The control member 328 is slidably mounted in the guide 330. The position of the control member 328 is adjusted by the adjusting screw 332 rotatably mounted in the front wall 334 of the range. The outer end of the screw 332 is provided with a combined adjusting knob and dial 336 by which it may be adjusted to any temperature which it is desired to reach and maintain.

The control member 328 is provided with a projection against which is held a lever 338 upon which is mounted an expansible and contractable metal bellows or diaphragm 340. The lever 338 is held in contact with the control member 328 by a suitable spring 342. The lever 338 is pivotally mounted upon a pivot 344 connected to the structure of the control. The interior of the bellows 340 is connected by a flexible capillary tube 346 to a thermostat bulb 348 mounted at the center of the surface heating elements 320 and 322 in a position to be in contact with the bottom of the container 350. The object is to control the upper limits of temperature of the contents of the container 350 which is in heat exchange relationship with the elements 320 and 322 of the surface heating unit. The bellows 340 is provided with a follower 352 provided with a spool-shaped lost motion connection 354 with the second lever 356. This second lever 356 is connected by the pivot 358 to the control structure. The opposite end of the lever 356 is provided with a compression-type snap-action spring 360 extending between the extreme end of the lever 356 and the portion 362 of the control structure in a column loading arrangement so as to cause the lever 356 to move by snap-action. The lever 356 carries a bridge-type contact 364 adapted to bridge the conductors 366 and 368. The conductor 368 connects to the second terminal of the heating element 320. The conductor 366 through a flexible conductor 370 connects to the adjustable contact 372 of an infinite heat-type of control. This infinite heat type of control also includes a continuously vibrated contact 374 operated by the rotary cam 376 mounted upon the shaft of an electric motor 378 which rotates continuously during the use of the surface heating unit. The motor 378 is connected by the conductor 380 to the conductor 324 so that it is under the control of the resiliently mounted bridge-type contact 326. The motor 378 is also connected to the neutral supply conductor N.

This infinite heat or infinite range-type of switch may be of the motor operated type like that shown in the Wilhjelm Patent 1,767,636. However, if desired it may also be of the thermostatically operated type similar to that shown in the Appelberg Patent 1,908,676.

The vibrating contact 374 is connected by the conductor 382 to one terminal of a bridge type switch contact arrangement 384 in which the bridge member is is mounted upon a third lever 386. This third lever 386 is connected by the pivot 388 to the control structure and is adapted to be moved to open the contact mechanism 384 by an extension 390 of the bellows follower 352 upon its overtravel beyond its position at the opening temperature of the bridge contact 364.

The second terminal of the bridge-type contact mechanism 384 is connected by the flexible conductor 392 to the bridge contact 364 and by a second conductor 394 to the other supply conductor $L_2$.

This system starts all cooking at the maximum rate. It is operated as follows: after the container 350 and its contents are placed upon the surface heating unit comprising the elements 320 and 322, the dial knob 336 is adjusted to the temperature to which it is desired to heat and maintain the container 350 and its contents. Through the screw connection of the screw 332 with the control member 328, the control member 328 will be moved toward the knob 336 thus closing the resiliently mounted bridge contact 326. At the same time the bellows 340, the lever 338, the bellows follower 352 and its extension 390 will also be moved toward the dial knob 336 thereby closing both the bridge-type switch contact members 384 and 364. This will cause the motor 378 to rotate the cam 376 and vibrate the contact 374.

However, since the switch 364 has been closed, the contacts 372 and 374 will be shunted out and current will flow from the supply conductor $L_1$ through the resiliently mounted bridge contact 326 and the conductor 324 through the large heating element 320 and the conductor 368 and thence through the bridge contact 364, the flexible conductor 392 and the conductor 394 to the second supply terminal $L_2$. Current will also flow from the conductor 324 through the small heating element 322 and the conductor 396, thence through the conductor 366, the bridge contact 364 and the conductors 392 and 394 to the second supply conductor $L_2$ so that both elements 320 and 322 are connected in parallel across the two live supply conductors $L_1$ and $L_2$ of the three wire single phase supply system for maximum power input until the selected cooking temperature is reached.

The cooking is completed by the heating element 322 alone under the control of the adjustable infinite heat switch 372-4. When the container 350 attains the temperature for which the dial knob 336 is set, the liquid within the thermostat bulb 348 will expand sufficiently to cause a flow of liquid through the capillary tube 346 into the bellows 340. This will cause the bellows 340 to extend and cause the spool 354 upon the follower 352 to move the lever 356 and the bridge contact 364 to the open position as shown in Figure 1 with a snap-action provided by the column loaded toggle spring 360. This will disconnect the heating element 320 and it likewise opens the shunt across the contact 372 and 374. The current will then flow through the heating element 322 and the conductors 396 and 370 during the intermittent closed periods of the contacts 372 and 374 from which the current flow will continue through the conductor 382, the bridge contact 384 and the conductor 394 to the second supply conductor $L_2$.

Figure 7:
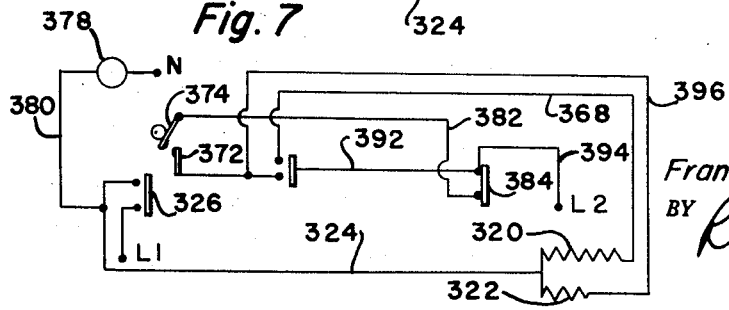
Figure 7 is a simplified wiring diagram shown in Figure 6.
Figure 8:
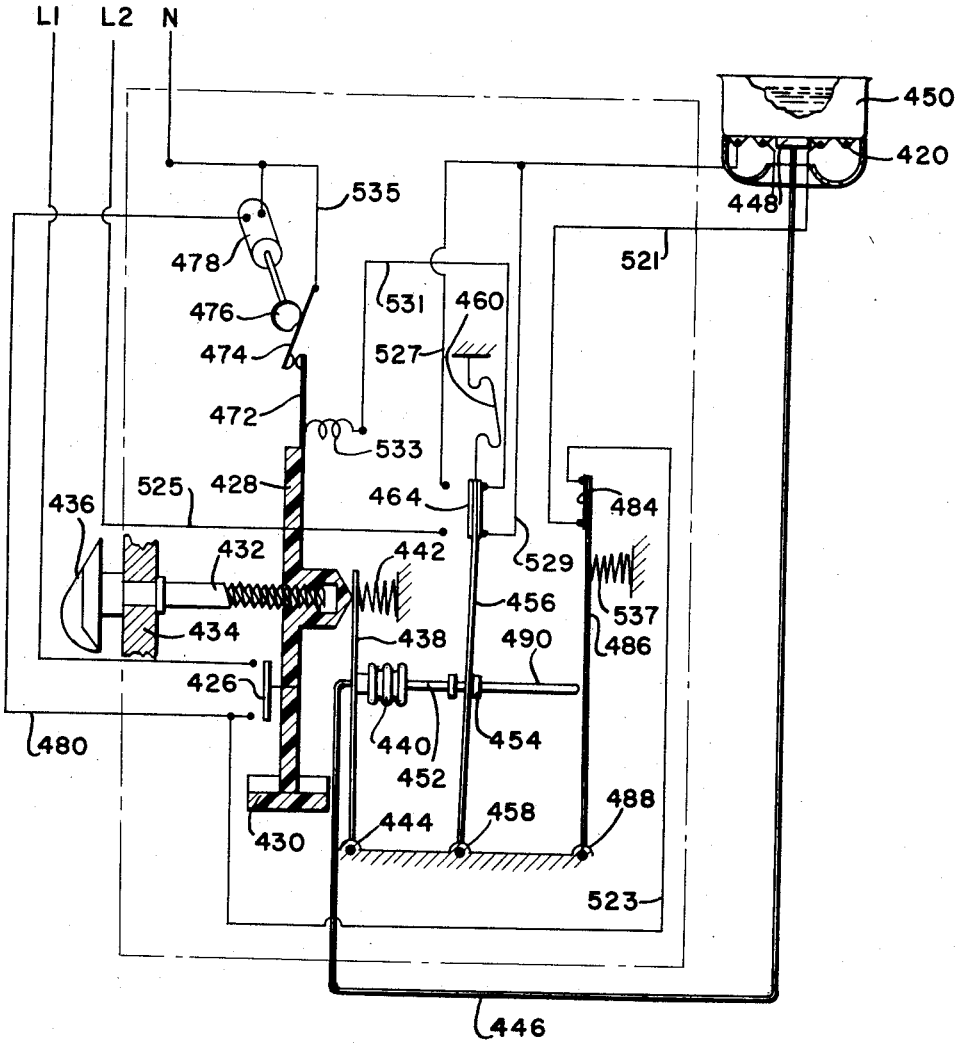
Figure 8 is a diagrammatic representation of a control and electrical system embodying a fourth form of my invention.
Figure 9:
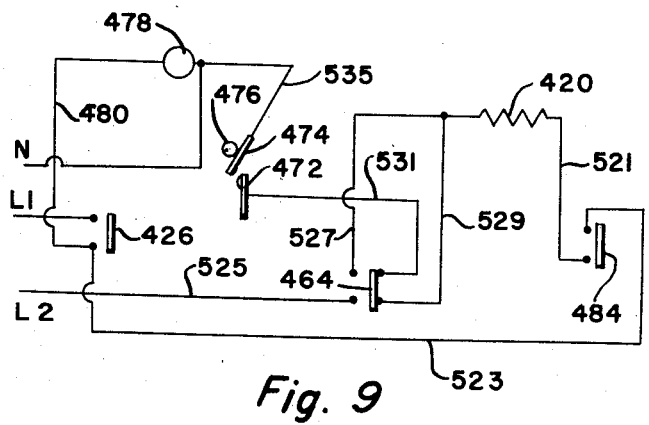
Figure 9 is a simple wiring diagram of the system shown in Figure 8.

The modification shown in Figures 8 and 9 differs from the modification shown in Figures 6 and 7 in that a single heating element is used and brought up to temperature by a continuous connection to the high voltage supply after which the power input is reduced by reconnecting the heater in series with the adjustable infinite heat switch to a lower voltage supply. Referring now to Figures 8 and 9 there is shown a heating element 420 associated in heating relationship with the container 450 which is to be heated. One terminal of this heating element 420 is connected by the conductor 521 to one terminal of the bridge-type contact mechanism 484. The other terminal of the bridge-type contact mechanism 484 is connected by the conductor 523 to one terminal of the bridge-type contact 426. The other terminal of the bridge-type contact 426 is connected to the supply terminal $L_1$.

The bridge-type contact 426 is resiliently mounted upon the control member 428 which is guided by the guideway 430. The control member 428 is moved by the adjusting screw 432 rotatably mounted in the wall 434 of the range. On the outside of this wall 434, the screw 432 is provided with a dial knob 436 which may be turned to various temperature designated positions to accomplish a corresponding movement of the control member 428. The control member 428 controls the position of a lever 438 upon which is mounted the flexible metal bellows 440. This lever 438 is held in contact with the control member 428 by the compression-type coil spring 442. The lever is pivoted upon the pivotal connection 444 to the control structure.

The bellows 440 is connected by a capillary tube 446 to a thermostat bulb 448 located in direct contact with the bottom of the container 450. The bellows 440 is provided with a follower 452 provided with a spool-shaped member 454 forming a lost motion connection with the lever 456. One end of this lever 456 is pivotally connected by the pivotal connection 458 with the control structure while the opposite end carries a double throw bridge contact 464. One terminal of this bridge contact 464 is connected by the conductor 525 to the supply terminal $L_2$. The second terminal of the bridge contact 464 is connected by the conductor 527 to the second terminal of the heating element 420. The conductor 527 is also connected by the conductor 529 to the third terminal of the double throw switch 464 while the fourth terminal of the double throw switch is connected by the conductor 531 and the flexible conductor 533 to the movable contact 472 mounted upon the control member 428.

The contact 472 is adapted to be moved along with the control member 428 toward or away from the vibrating contact 474 which is vibrated by the rotary cam 476. The contact 474 is connected by the conductor 535 to the neutral conductor N. The motor 478 which drives the rotary cam 476 also has one terminal connected to the neutral terminal N. The second terminal of the motor 478 is connected by the conductor 480 to the one terminal of the resiliently mounted bridge contact 426 which controls the electrical connection with the terminal $L_1$.

The lever 456 is provided with a toggle spring 460 extending between a portion of the control structure and the end of the lever 456 in the column loading arrangement. This in conjunction with the spool-type lost motion connection 454 causes the double throw bridging contact 464 to move with a snap-action. The follower 452 is provided with an extension 490 operating after sufficient overtravel beyond the snap acting positions of contact 464 upon the lever 486 to open the bridge contact 484. The lever 486 is pivotally connected by the pivotal connection 488 to the control structure. A spring 537 may be provided to keep the lever 486 in contact with the follower 490.

In operation, when the dial knob 436 is turned from off position shown in Figure 8 to one of its temperature designated positions, the bridge contact 426 will first be closed to connect the terminal $L_1$ through the conductors 523, the bridge contact 484, the conductor 521, the heating element 420, the conductor 527 which will be connected by the bridge contact 464 to the conductor 525 which connects to the terminal $L_2$. This energizes the heating element 420 continuously at the maximum voltage of 235 volts for maximum power input. The movement of the control member 428 to the left moves the bellows 440 and its followers to the left to move the bridge contact 464 into bridging relationship with the conductors 525 and 527. This also insures the closing of the bridge contact 484.

The terminals $L_1$, $L_2$ and N represent three wire single phase supply source having a voltage of about 235 volts across the terminals $L_1$ and $L_2$ while the voltage between the neutral terminal and either of the terminals $L_1$ or $L_2$ is ½ this or 117 volts. Thus initially, the heating element 420 will be connected across the 235 volt supply to provide the maximum heat output.

However, when the temperature of the container 450 reaches the temperature selected by the location of the dial knob 436, the hydraulic liquid within the thermostat bulb 448 will expand and cause a movement of the liquid through the capillary tube 446 into the flexible metal bellows 440 to move the follower 452 and the spool 454 to the right a sufficient amount to move the lever 456 and the toggle spring 460 across the dead center position so as to break the connection with the conductors 525 and 527 and to bridge the conductors 529 and 531. The movement however will not be sufficient to open the bridging contact 484.

This does not disturb the connection of the one terminal 420 through the conductors 521, the bridging contact 484, the conductor 523, the bridge contact 426 with the supply terminal $L_1$. However, it breaks the connection of the heater 420 with the supply terminal $L_2$ and instead through the conductor 529, the bridging contact 464, the conductors 531 and 533, the contacts 472 and 474 and the conductor 535 provides a connection with the neutral terminal N. This will limit the maximum power input to the heating element 420 when the contacts 472 and 474 are closed to ¼ the previous maximum power input in which both terminals were connected to the supply terminals $L_2$ and $L_1$. However the power input is further reduced by the interrupted opening and closing of the contacts 472 and 474 in a manner similar to the contacts 372 and 374 of Figure 6. The adjustment of the control member 428 by moving the contact 472 toward or away from the contact 474 makes it possible to obtain any desired heat output between 0 and 100% of the maximum possible across the 117 volt supply terminals or between 0 and 25% of the maximum obtainable from the 235 volt terminals $L_1$ and $L_2$. The container 450 will then be supplied with heat at a very reduced rate which is just sufficient to keep the temperature at the point set by the dial knob 436.

In the event that the container 450 should be heated substantially above the temperature set by the knob 436, there will be additional liquid expansion in the bulb 448 which will cause an additional expansion of the bellows 440 beyond the point at which the toggle spring 460 snaps so that upon the resulting overtravel the follower 490 will move to the right sufficiently far to open the bridging contact 484 to cut off the flow of current to completely stop the heat. This will prevent burning of food, especially when the contents of the container 450 boil dry, but this is also useful to prevent overheating of other liquids and solids.

In accordance with the provisions of Rule 78a, reference is made to the following prior filed application, S. N. 407,642, filed February 2, 1954.

While the form of embodiment of the invention as herein disclosed constitutes a preferred form, it is to be understood that other forms might be adopted, as may come within the scope of the claims which follow.

What is claimed is as follows:

1. An electrical system including electrical heating means for heating a substance, a first circuit having means for obtaining a high rate of energy conversion from said heating means, a second circuit having means for obtaining a lower rate of energy conversion from said heating means, an adjustable infinite heat switch means connected in controlling relationship with said second circuit for providing an infinitely adjustable control superimposed upon said lower rate of energy conversion of said heating means, and temperature responsive means responsive to predetermined conditions of said same substance for changing the effective energization from the first circuit to the second circuit, said temperature responsive means having additional means responsive to other predetermined conditions of said same substance for substantially deenergizing said heating means.

2. A control system for an electric heating means to be supplied from a power source including circuit and heating means having a first portion and a second portion, first switch means for connecting and disconnecting said first portion from said power source, an infinite heat switch means connected in series with said circuit and heating means, adjustment means for said infinite heat switch means for varying the proportion of closed periods from a small value to 100%, and means controlled by said adjustment means having means effective at an intermediate portion of its adjustment for moving said first switch means from one position to another.

3. A control system for an electric heating means to be supplied from a power source including circuit and heating means comprising a first portion providing a high heating rate and a second portion providing a low heating rate, a double throw switch means having a first position connecting said first portion to said power source and having a second position connecting said second portion to said power source, an infinite heat switch means connected in series relationship with said circuit and heating means for providing intermittent energization, adjustment means for said infinite heat switch means having a range of adjustment for varying the proportion of switch closed time to switch open time from a small value to 100%, and means operated by and coordinated with said adjustment means having means effective at an intermediate portion of its adjustment for moving said double throw switch means to said first position in one portion of the adjustment range and to said second position in another portion of the adjustment range.

4. A control system for an electric heating means to be supplied from a power source including circuit and heating means comprising a first portion providing a first heating rate and a second portion providing a second heating rate which is a fraction of the first heating rate, a double throw switch means having a first position connecting said first portion to said power source and having a second position connecting said second portion to said power source, an infinite heat switch means connected in series relationship with said circuit and heating means for providing intermittent energization, adjustment means for said infinite heat switch means having a first portion providing a range of 0 to 100% and a second portion providing a range between said fraction and 100%, and means operated by and coordinated with said adjustment means having means effective at an intermediate portion of its adjustment for moving said double throw switch means to said second position in said first portion of said adjustment means and for moving said double throw switch means to said first position in the second portion of the adjustment means.

5. An electrical heating system for heating receptacles upon the top of a support including an electric surface heating means for supporting a receptacle, a contact device associated with the heating means for maintaining contact with such a receptacle, power supply conductors, an adjustable two-step thermostat substantially responsive to the temperature of said contact device, said thermostat having successively operating first and second step controls provided with an increment in temperature between their successive operation and also having selective means for adjusting the selected temperatures of the contact device at which said first and second step controls are operated, a cycling switch means cycling independently of said thermostat at a substantially uniform rate, circuit means connecting said supply conductors and said heating means and said controls and said cycling switch means, said first step control having means for controlling said circuit means to obtain maximum heat input from said heating means when said contact device is below the selected temperature for its operation and for connecting said cycling switch means effectively in circuit with a portion of said heating means when said device is above the temperature selected for its operation, said second step control having means for completely deenergizing said heating means when said device is above the temperature selected for its operation.

6. An electrical heating system for heating receptacles upon the top of a support including an electric surface heating means for supporting a receptacle, a contact device associated with the heating means for maintaining contact with such a receptacle, power supply conductors, an adjustable two step thermostat substantially responsive to the temperature of said contact device, said thermostat having successively operating first and second step controls provided with an increment in temperature between their successive operation and also having selective means for adjusting the selected temperatures of the contact device at which said first and second step controls are operated, a cycling switch means cycling independently of said thermostat at a substantially uniform rate, said cycling switch means being connected between one of the supply conductors and a portion of said heating means, said first step control including means effective in one position for connecting the heating means to the supply conductors for maximum energization and effective in a second position for disconnecting a portion of said heating means from one of the supply conductors and for controlling the energization of the heating means by the cycling switch means, said second step control including means for deenergizing said heating means.

7. An electrical heating system for heating receptacles upon the top of a support including an electric surface heating means for supporting a receptacle, a contact device associated with the heating means for maintaining contact with such a receptacle, power supply conductors, an adjustable two-step thermostat substantially responsive to the temperature of said contact device, said thermostat having successively operating first and second step controls provided with an increment in temperature between their successive operation and also having selective means for adjusting the selected temperature of the contact device at which said first and second step controls are operated, a cycling switch means cycling independently of said thermostat at a substantially uniform rate, circuit means connecting said supply conductors and said heating means and said controls and said cycling switch means, said first step control having means for controlling said circuit means to obtain maximum heat input from said heating means when said contact device is below the selected temperature for its operation and for connecting said cycling switch means effectively in circuit with a portion of said heating means when said device is above the temperature selected for its operation, said second step control having means for completely deenergizing said heating means when said device is above the temperature selected for its operation, said selective means also having means for adjusting said cycling switch means to change the proportion of closed time to open time.

8. An electrical heating system for heating receptacles upon the top of a support including an electric surface heating means for supporting a receptacle, a contact device associated with the heating means for maintaining contact with such a receptacle, power supply conductors, an adjustable two-step thermostat substantially responsive to the temperature of said contact device, said surface heating means having three terminals, means connecting one of said terminals to one supply conductor, said thermostat having successively operating first and second step switches provided with an increment in temperature between their successive operation and also having selective means for adjusting the selected temperatures of the contact device at which said first and second step controls are operated, said first switch being connected between the second and third terminals and the second supply conductor, a cycling switch means cycling independently of said thermostat at a substantially uniform rate connected between the third terminal and the second supply conductor, said second step switch being connected in series with one of said terminals.

9. An electrical heating system for heating receptacles upon the top of a support including an electric surface heating means for supporting a receptacle, a contact device associated with the heating means for maintaining contact with such a receptacle, power supply conductors, an adjustable two-step thermostat substantially responsive to the temperature of said contact device, said thermostat having successively operating first and second step controls provided with an increment in temperature between their successive operation and also having means for adjusting the selected temperatures of the contact device at which said first and second step controls are operated, said heating means having a terminal connected to one supply conductor and a second terminal connected to said first step control, said first step control including a snap acting double throw switch having its common connection connected to said second terminal and a first alternate connection connected to the second supply conductor and a second alternate connection connected to the third supply conductor, said second step control having means for completely and entirely deenergizing said heating means.

10. An electrical system including a first heating element for heating a substance, a second heating element for heating said same substance, an adjustable infinite heat switch means connected in series circuit relationship with said second element, temperature responsive switch means responsive to the temperature of said same substance for effectively deenergizing one of said elements without deenergizing the other element, and a second temperature responsive switch means responsive to a higher temperature of said same substance than said first mentioned temperature responsive switch means for effectively deenergizing both elements, said adjustable infinite heat switch including an adjustment means for varying the proportion of contact closed time to contact open time, said adjustment means also including means for simultaneously adjusting one of said temperature responsive switch means.

References Cited in the file of this patent

UNITED STATES PATENTS

| | | |
|---|---|---|
| 2,224,596 | Desfachelles | Dec. 10, 1940 |
| 2,294,573 | Potter | Sept. 1, 1942 |
| 2,295,298 | Sharp | Sept. 8, 1942 |
| 2,403,824 | Newell | July 9, 1946 |
| 2,410,013 | Clark | Oct. 29, 1946 |
| 2,410,014 | Clark | Oct. 29, 1946 |
| 2,445,021 | Clark | July 13, 1948 |
| 2,524,506 | Akeley | Oct. 3, 1950 |
| 2,648,755 | Voglsberg | Aug. 11, 1953 |
| 2,668,223 | McCormick | Feb. 2, 1954 |
| 2,728,842 | Turner | Dec. 27, 1955 |
| 2,798,929 | Wojcik | July 9, 1957 |
| 2,804,531 | Dadson | Aug. 27, 1957 |